United States Patent
Kandhalu Raghu et al.

(10) Patent No.: US 9,854,516 B2
(45) Date of Patent: Dec. 26, 2017

(54) SLOT SKIPPING TECHNIQUES FOR REDUCED POWER CONSUMPTION IN TIME SLOTTED CHANNEL HOPPING MAC PROTOCOL

(71) Applicant: Texas Instruments Incorporated, Dallas, TX (US)

(72) Inventors: Arvind Kandhalu Raghu, Dallas, TX (US); Ariton E. Xhafa, Plano, TX (US); Jianwei Zhou, Allen, TX (US); Ramanuja Vedantham, Allen, TX (US); Xiaolin Lu, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 26 days.

(21) Appl. No.: 14/751,602

(22) Filed: Jun. 26, 2015

(65) Prior Publication Data
US 2016/0037449 A1  Feb. 4, 2016

Related U.S. Application Data

(60) Provisional application No. 62/031,482, filed on Jul. 31, 2014.

(51) Int. Cl.
*H04W 52/02* (2009.01)
*H04L 5/00* (2006.01)
(Continued)

(52) U.S. Cl.
CPC ....... *H04W 52/0209* (2013.01); *H04L 5/0048* (2013.01); *H04W 48/00* (2013.01);
(Continued)

(58) Field of Classification Search
None
See application file for complete search history.

(56) References Cited

U.S. PATENT DOCUMENTS 8,805,317 B2 * 8/2014 Jung ................. H04W 52/0216
370/311
8,817,677 B2 * 8/2014 Ukita ................ H04W 52/0277
370/310

(Continued)

OTHER PUBLICATIONS

"Part 15.4: Low-Rate Wireless Personal Area Networkw (LR-WPANs)", IEEE Standard for Local and metropolitan area networks, IEEE Computer Society, IEEE Std 802.15.4-2011, Sep. 5, 2011, New York, New York, pp. 1-314.

(Continued)

*Primary Examiner* — Eunsook Choi
(74) *Attorney, Agent, or Firm* — Ronald O. Neerings; Charles A. Brill; Frank D. Cimino

(57) ABSTRACT

A device may be coupled to a time slot based communication system and receive a timing beacon packet that is broadcast in a time slot of the communication system at a periodic rate, in which the network uses a time slotted channel hopping protocol of sequential frames each having a plurality of time slots. The device may synchronize its time base to the timing beacon. The device may calculate a sleep time corresponding to a number of time slots until a next time slot that is scheduled for use by the device and then place the device in a sleep mode. The device may be awakened after the sleep time and operate during the next time slot. The device may repeat the process of calculating a sleep time, going into sleep mode, and waking for operation after the sleep time in order to reduce power consumption.

20 Claims, 6 Drawing Sheets

(51) Int. Cl.
*H04W 56/00* (2009.01)
*H04W 48/00* (2009.01)
*H04W 72/12* (2009.01)
*H04W 84/10* (2009.01)
*H04W 84/18* (2009.01)

(52) U.S. Cl.
CPC ......... *H04W 56/001* (2013.01); *H04W 72/12* (2013.01); *H04W 84/10* (2013.01); *H04W 84/18* (2013.01); *Y02B 60/50* (2013.01)

(56) References Cited

U.S. PATENT DOCUMENTS

| | | | |
|---|---|---|---|
| 2006/0140208 A1* | 6/2006 | Couch | H04W 56/0015 370/445 |
| 2010/0019887 A1* | 1/2010 | Bridgelall | H04Q 9/00 340/10.2 |
| 2011/0103264 A1* | 5/2011 | Wentink | H04W 8/005 370/255 |
| 2011/0176464 A1* | 7/2011 | Warner | H04B 1/713 370/311 |
| 2013/0016757 A1* | 1/2013 | Hui | H04B 1/7156 375/134 |
| 2014/0112225 A1* | 4/2014 | Jafarian | H04W 52/0235 370/311 |
| 2014/0153460 A1* | 6/2014 | Shrivastava | H04W 52/0225 370/311 |

OTHER PUBLICATIONS

"CC2650 SimpleLink Multistandard Wirelessw MCU", CC2650, Texas Instruments, Inc., SWRS158, Feb. 2015, pp. 1-52.

Yu-Chee Tseng, Chih-Shun Hsu and Ten-Yueng Hsich, "Power-Saving Protocols for IEEE 802.11-Based Multi-Hop Ad Hoc Networks", IEEE INFOCOM 2002, Twenty-First Annual Joint Conference of the IEEE Computer and Communications Societies, Proceedings, Jun. 23-27, 2002, New York, New York, 200-209, vol. 1.

"Part 15.4: Low-Rate Wireless Personal Area Networks (LR-WPANs), Amendment 1: MAC Subplayer", IEEE Standard for Local and metropolitan networks, IEEE Computer Society, IEEE Std 802.15.4e-2012, Apr. 16, 2012, New York, New York, pp. 1-225.

* cited by examiner

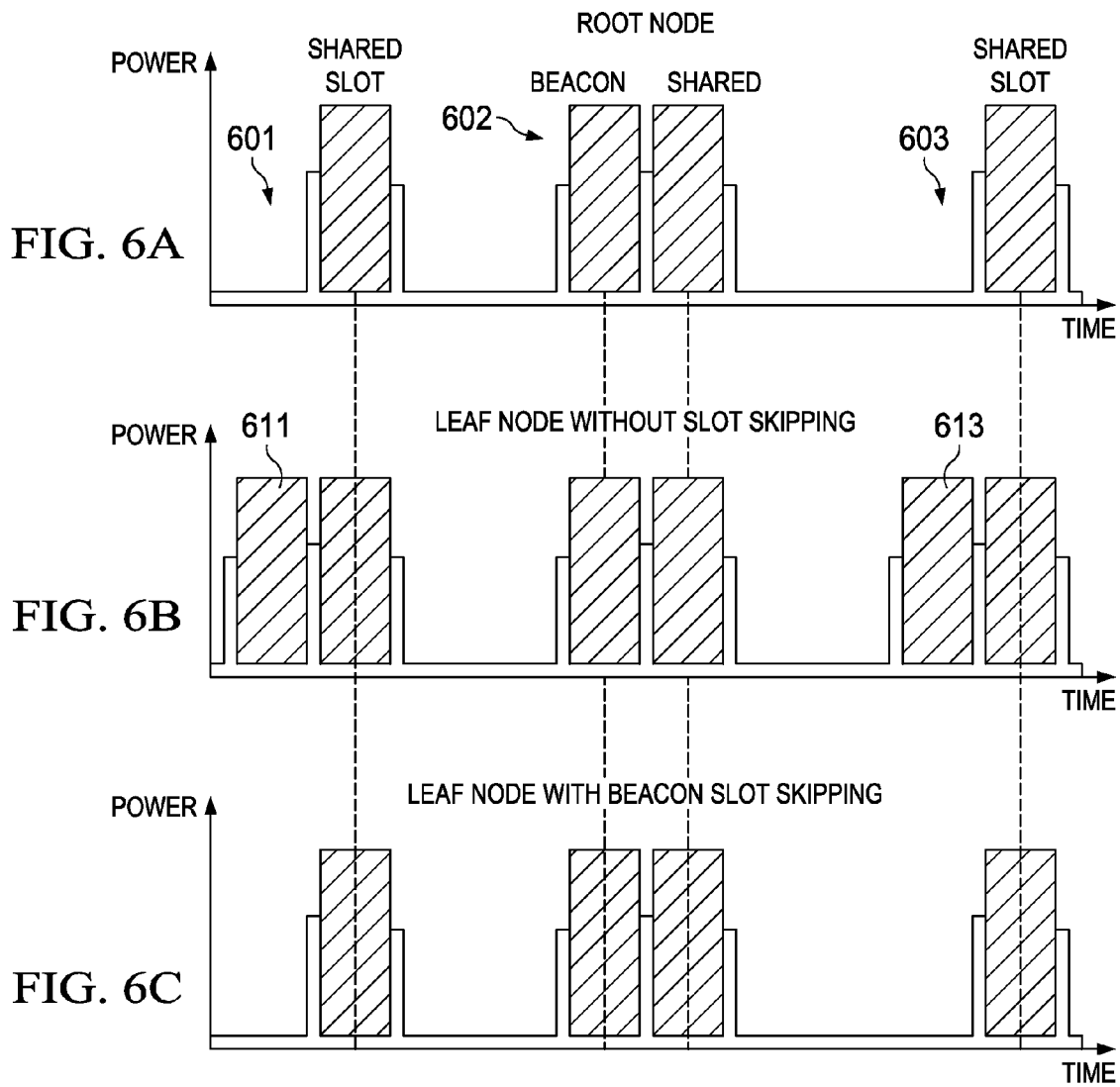

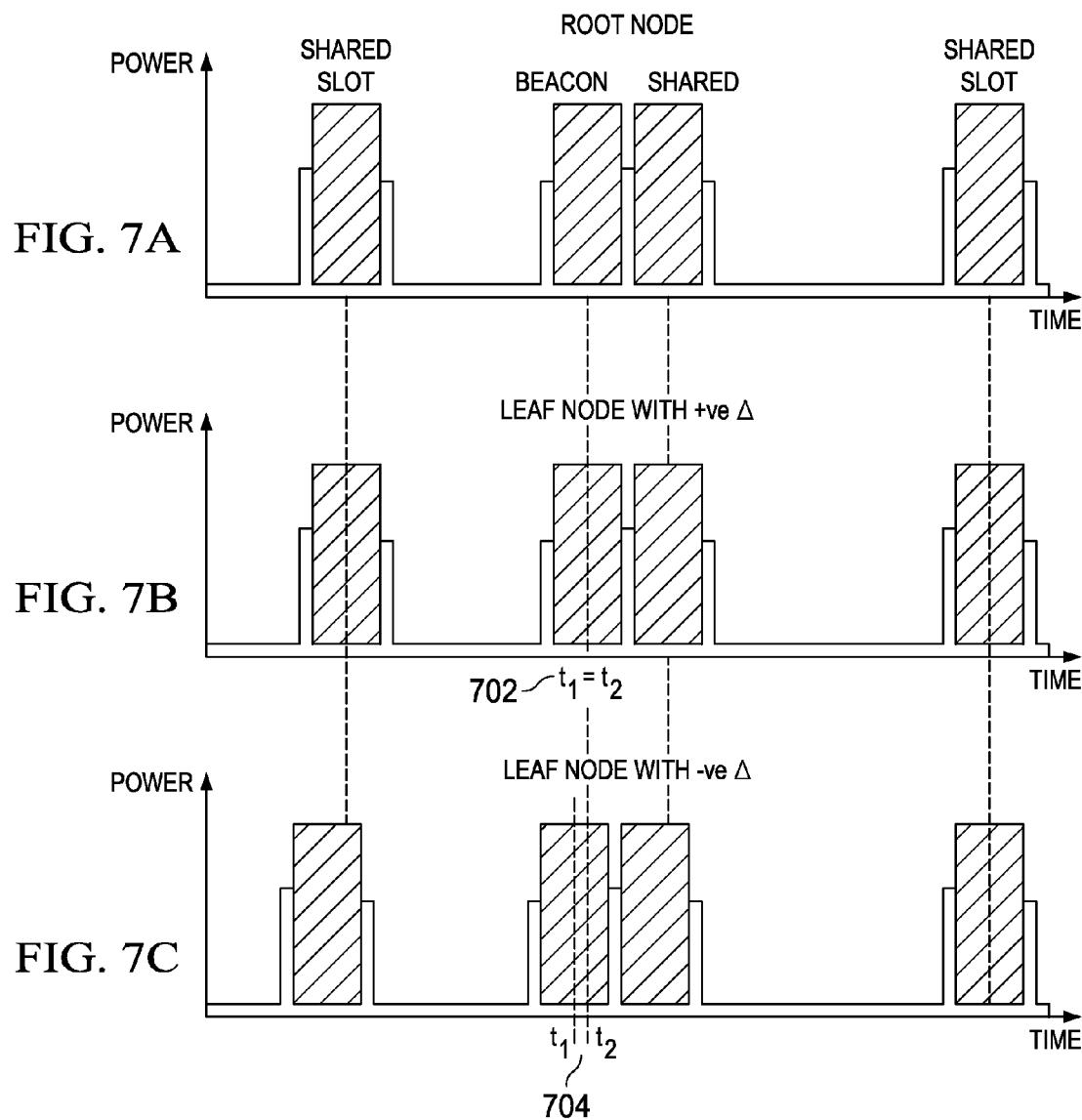

SLOT SKIPPING TECHNIQUES FOR REDUCED POWER CONSUMPTION IN TIME SLOTTED CHANNEL HOPPING MAC PROTOCOL

CLAIM OF PRIORITY UNDER 35 U.S.C. 119(e)

The present application claims priority to and incorporates by reference U.S. Provisional Application No. 62/031,482, filed Jul. 31, 2014, entitled "Slot Skipping Techniques For Reduced Power Consumption In Time Slotted Channel Hopping Mac Protocol".

FIELD OF THE INVENTION

This invention generally relates to wireless personal area networks, and more particularly to slot skipping techniques for reduced power consumption in a time slotted channel hopping (TSCH) MAC protocol.

BACKGROUND OF THE INVENTION

IEEE 802.15.4e is an enhanced MAC layer protocol of 802.15.4 designed for low power and low rate networks. It is suitable for sensor devices with resource constraints; e.g., low power consumption, low computation capabilities, and low memory. Time-Slotted Channel Hopping (TSCH) is a MAC mechanism in IEEE 802.15.4e networks. In TSCH, time is divided into time slots, and every device is time-synchronized to a root node in the network and uses the time slots to communicate/synchronize in the network. The device hops among all channels according to a frequency hopping sequence (FHS) during the time slots. TSCH can achieve higher capacity and provides finer granularity for power savings in IEEE 802.15.4e networks.

Wireless personal area networks (WPANs) are used to convey information over relatively short distances. Unlike wireless local area networks (WLANs), connections effected via WPANs involve little or no infrastructure. This feature allows small, power-efficient, inexpensive solutions to be implemented for a wide range of devices. Two different device types can participate in an IEEE 802.15.4 network: a full-function device (FFD) and a reduced-function device (RFD). An FFD is a device that is capable of serving as a personal area network (PAN) coordinator. An RFD is a device that is not capable of serving as a PAN coordinator. An RFD is intended for applications that are extremely simple, such as a light switch or a passive infrared sensor; it does not have the need to send large amounts of data and only associates with a single FFD at a time. Consequently, the RFD can be implemented using minimal resources and memory capacity.

BRIEF DESCRIPTION OF THE DRAWINGS

Particular embodiments in accordance with the invention will now be described, by way of example only, and with reference to the accompanying drawings:

FIGS. 6A-6C are plots of power consumption illustrating beacon skipping;

FIGS. 7A-7C are plots of power consumption illustrating timing drift determination.

Figure 1:
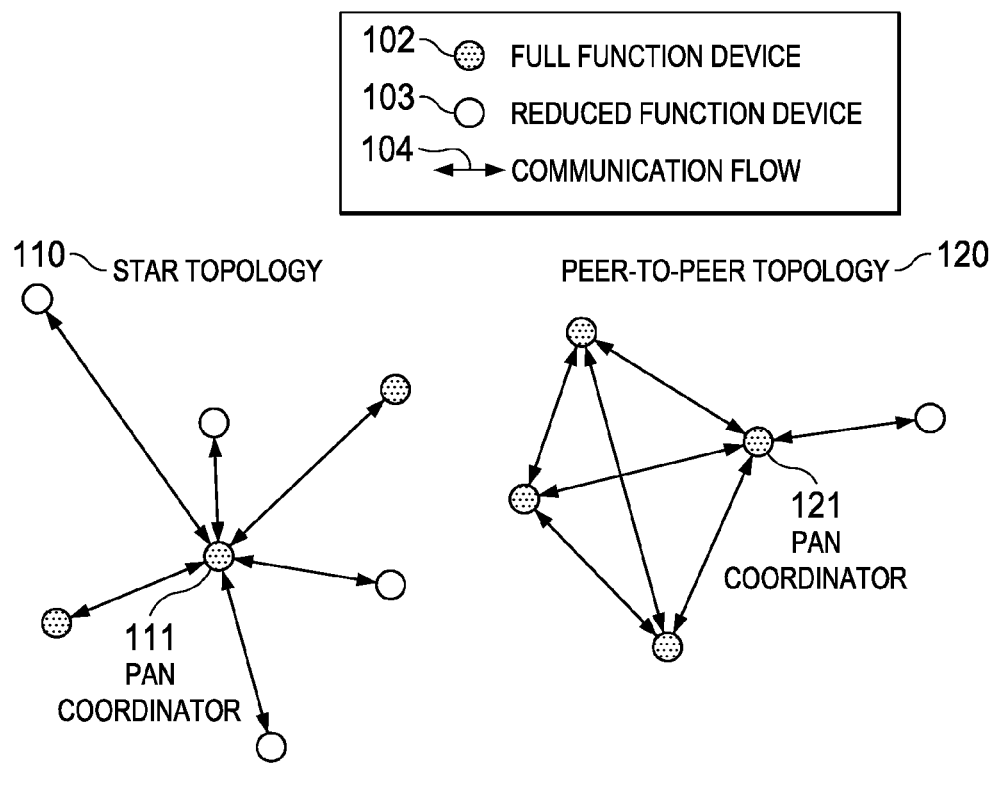
FIG. 1 includes illustrations of example personnel area networks.

Other features of the present embodiments will be apparent from the accompanying drawings and from the detailed description that follows.

DETAILED DESCRIPTION OF EMBODIMENTS OF THE INVENTION

Specific embodiments of the disclosure will now be described in detail with reference to the accompanying figures. Like elements in the various figures are denoted by like reference numerals for consistency. In the following detailed description of embodiments of the disclosure, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

IEEE 802.15.4e is an enhanced MAC layer protocol of 802.15.4 designed for low power and low rate networks. It is suitable for sensor devices with resource constraints; e.g., low power consumption, low computation capabilities, and low memory. As sensors and actuators that are interconnected by a personal area network (PAN) in home and office environments become more common, limiting power dissipation of each device is important. Some devices may operate on a battery, in which case frequent battery changes are undesirable. Some devices may operate on a limited amount of power that is generated by the device itself using various means, such as: conversion from solar or other light sources, scavenging from motion or thermal effects, collection of energy from ambient electromagnet fields, etc.

Time-Slotted Channel Hopping (TSCH) is a MAC mechanism in IEEE 802.15.4e networks. In TSCH, time is divided into time slots, and every device is time-synchronized to a root node in the network and uses the time slots to communicate/synchronize in the network. A typical IEEE 802.15.4e network may utilize 1.2 second frames that are divided into 10 ms slots, for example. Devices may transition into a low power sleep mode when they are not active in order to conserve power. However, each device wakes up at the beginning of each time slot in order to determine if a timing beacon is being transmitted in that slot. These short wakeup events that occur every slot may dissipate a significant amount of power.

Embodiments of the present disclosure may reduce power consumption by predicting when a timing beacon will arrive and thereby avoid unnecessary device wakeups for every time slot in order to reduce power consumption. Embodiments of the disclosure may also detect and avoid inefficient use of slots by a device in order to reduce power consumption. A detailed description of these power saving modes of device operation are described in more detail below.

FIG. 1 includes illustrations of two types of example personnel area networks, a star topology 110 and a peer-to-peer topology 120. Both types may coexist in a home or office, for example. In this example, full function devices (FFD) 102 are represented by a solid circle and reduced function devices (RFD) 103 are represented by an open circle. Device to device communication paths are represented by arrows 104. As mentioned earlier, IEEE 802.15.4e is an enhanced MAC layer protocol of 802.15.4 designed for low power and low rate networks. The general operation of IEEE 802.15.4 and IEEE 802.15.4e is well known and will not be described in detail herein; however, a brief description of the operation of IEEE 802.15.4e is provided below. A more detailed description may be found in the IEEE standards documents. IEEE Std. 802.15.4™-2011, "Low-Rate Wireless Personal Area Networks (LR-WPANs)" is incorporated by reference herein. Likewise, IEEE Std. 802.15.4e™-2012, "Low-Rate Wireless Personal Area Networks (LR-WPANs) Amendment 1: MAC sublayer" is incorporated by reference herein.

The IEEE 802.15.4e architecture is defined in terms of a number of blocks in order to simplify the standard. These blocks are called layers. Each layer is responsible for one part of the standard and offers services to the higher layers. The interfaces between the layers serve to define the logical links that are described in the standard. An LR-WPAN device comprises at least one PHY (physical layer), which contains the radio frequency (RF) transceiver along with its low-level control mechanism, and a MAC (medium access control) sublayer that provides access to the physical channel for all types of transfer.

Depending on the application requirements, an IEEE 802.15.4e LR-WPAN may operate in either of two topologies: the star topology 110 or the peer-to-peer topology 120. Both are illustrated in FIG. 1. In the star topology, the communication is established between devices and a single central controller, called the PAN coordinator 111. PAN coordinator 111 may also be called the root node, for example. The other devices in the PAN may be referred to as leaf nodes, for example. A device typically has some associated application and is either the initiation point or the termination point for network communications. A PAN coordinator may also have a specific application, but it may be used to initiate, terminate, or route communication around the network. The PAN coordinator is the primary controller of the PAN. All devices operating on a network of either topology have unique addresses, referred to as extended addresses. A device will use either the extended address for direct communication within the PAN or the short address that was allocated by the PAN coordinator when the device associated.

After FFD 111 is activated, it may establish its own network and become the PAN coordinator. All star networks operate independently from all other star networks currently in operation. This is achieved by choosing a PAN identifier that is not currently used by any other network within the radio communications range. Once the PAN identifier is chosen, the PAN coordinator allows other devices, potentially both FFDs and RFDs, to join its network. A higher layer can use the procedures described in IEEE Std 802.15.4e to form a star network.

The PAN coordinator 111 will often be powered by home or office wiring, while the other devices will most likely be battery powered. Applications that benefit from a star topology include home automation, personal computer (PC) peripherals, games, and personal health care, for example.

The peer-to-peer topology 120 also has a PAN coordinator 121, which may also be referred to as the root node; however, a peer-to-peer topology differs from the star topology in that any leaf device is able to communicate with any other leaf device as long as they are in range of one another. Peer-to-peer topology allows more complex network formations to be implemented, such as mesh networking topology.

One device, such as FFD 121, is nominated as the PAN coordinator, for example, by virtue of being the first device to communicate on the channel. Further network structures may be constructed out of the peer-to-peer topology, and it is possible to impose topological restrictions on the formation of the network. Each independent PAN selects a unique identifier. This PAN identifier allows communication between devices within a network using short addresses and enables transmissions between devices across independent networks.

Applications such as industrial control and monitoring, wireless sensor networks, asset and inventory tracking, intelligent agriculture, and security may benefit from a peer-to-peer network topology. A peer-to-peer network allows multiple hops to route messages from any device to any other device on the network. Such functions can be added at the higher layer, but they are not part of the 802.15.4e standard.

Figure 2A:
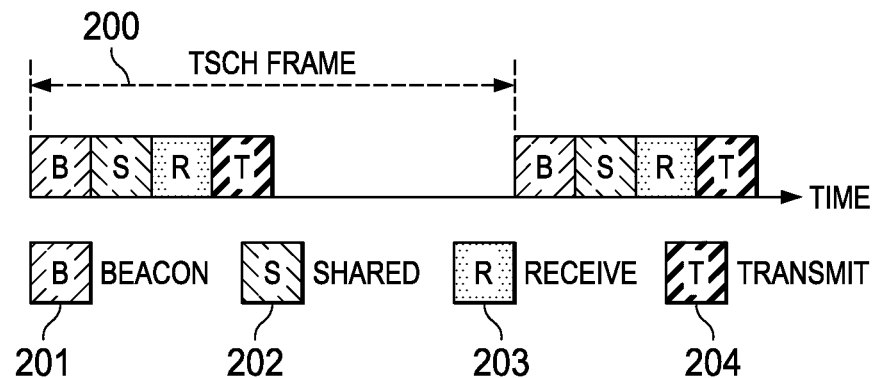
FIGS. 2A and 2B are simple timing diagrams illustrating operation of TSCH.

FIG. 2A is a simple timing diagram illustrating operation of TSCH. For devices using the optional TSCH mode, initial synchronization is performed by the use of enhanced beacons, and synchronization is maintained by slotted communication with other devices in the PAN.

In a TSCH PAN, the IEEE 802.15.4 concept of a superframe is replaced with a slotframe, such as illustrated at 200. As used herein, the terms "slotframe" and "frame" are interchangable. The slotframe also contains defined periods of communications between peers that may be either CSMA-CA (carrier sense multiple access w/collision avoidance) or guaranteed, but the slotframe automatically repeats based on the participating devices' shared notion of time, and does not require beacons to initiate communications. Example slot periods are illustrated for a beacon 201, shared slot 202, receive slot 203, and transmit slot 204.

Unlike the superframe, slotframes and a device's assigned timeslot(s) within the slotframe may initially be communicated by beacon, but are typically configured by a higher layer. Because all devices share common time and channel information, devices may hop over the entire channel space to minimize the negative effects of multipath fading and interference, and do so in a slotted way to avoid collisions, minimizing the need for retransmissions In order to ensure that it remains synchronized with the TSCH PAN, a network device may ensure that it communicates with each of its timekeeping neighbors at least once per Keep Alive period. The keep alive period is not defined in the current version of the IEEE 802.15.4e standard; however, based on the crystal clock accuracy, it is typically defined to be guard_time/(2*clock_accuracy), where the guard time may be defined by system designer, for example. Typically, a beacon packet may be transmitted periodically by the PAN coordinator and be for network timing synchronization. If a network device has not sent a packet to its time source neighbor within this interval, it may send any empty acknowledged MAC frame and use the acknowledgement frame to perform acknowledgement based synchronization.

Referring still to FIG. 2A, TSCH the protocol includes a sequence of frames 200 and each frame consists of some n number of slots. Out of n slots, there is at least one beacon 201 and a shared slot 202. The beacon slot is used by a PAN coordinator device, as described above, to transmit a beacon packet that includes a transmit/receive schedule for the other nodes in the network. The beacon is also used for time synchronization purposes. The shared slot is a contention slot used for new nodes to join the network as well as any other network maintenance related packets. Apart from the beacon and shared slot, according to the schedule sent out by the scheduler, the frame may also include a receive slot 203 and a transmit slot 204 allocated to a particular device.

Figure 2B:
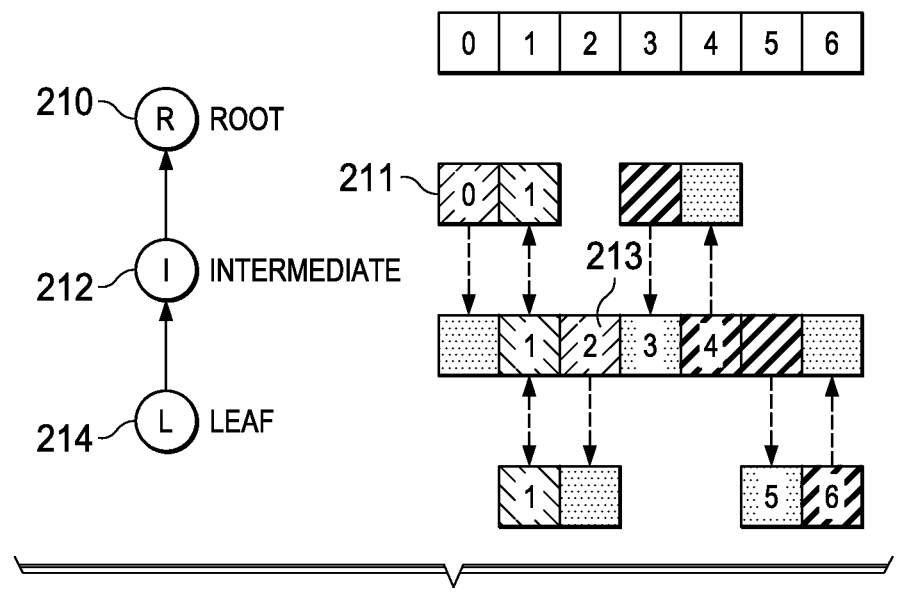

FIG. 2B illustrates operation of an example network that may include a root node 210, an intermediate node 212 and a leaf node 214. A typical network may include many more intermediate and leaf nodes than shown here. In this example, root node 210 may send a beacon packet 213 on time slot 0, which is received by intermediate node 212 and rebroadcast 213 during time slot 2 to leaf node 214. In this manner, a timing beacon may be propagated throughout a large network. In a similar manner, a leaf node may send and receive packets to and from an intermediate node, which may then forward the packets to the root node.

Figure 3:
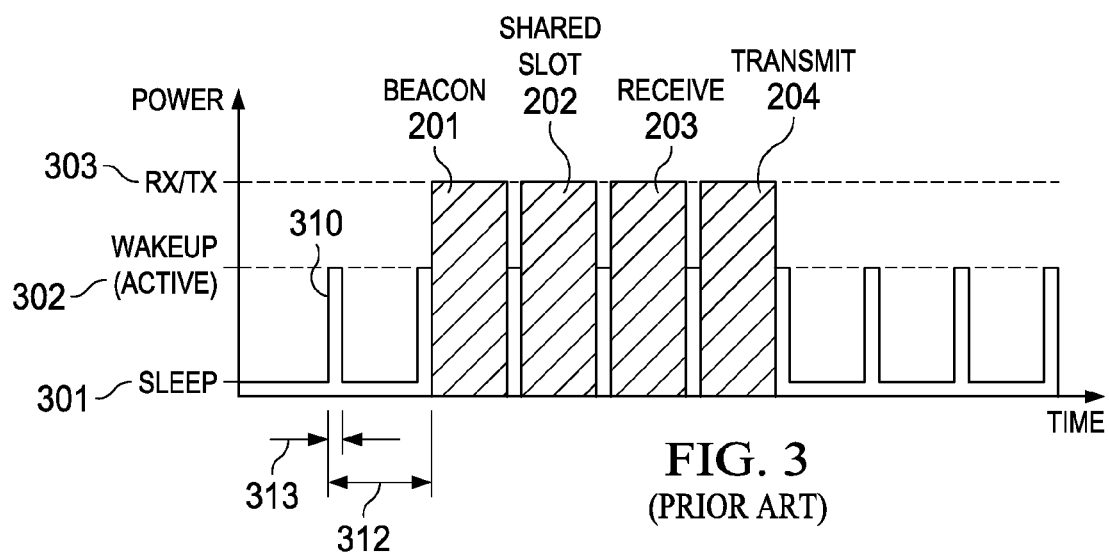
FIG. 3 is a plot of power consumption by a prior art TSCH device.

FIG. 3 is a plot of power consumption vs. time by a typical prior art TSCH device. Given the time slotted nature of TSCH, a node needs to be in active state 302 (switched ON) only in the beacon, shared, receive and transmit slots assigned to that device and may be in sleep state 301 (switched OFF or in a low-power consumption state) for the other slots. During actual transmit (TX) and receive (RX) operations, the RX/TX power level 303 may be higher. Previously, TSCH operation required that a node wakeup 310 for every slot to check if it has any function be performed in that time slot. In extremely low-power systems such as a battery-powered sensor node that transmits with very large time periods or only on rare events, waking up for every slot can be expensive. In addition, the wakeup overhead with respect to the slot size may be large. For example, consider a state transition overhead 313 of ~1 ms for 10 ms slot 312. This gives a 10% overhead which translates into a 10% energy consumption overhead in a slot. In a 12 slot slotframe, there is at least 8 ms of state transition overhead. Also the device must be in active state for at least four slots in every frame corresponding to beacon, shared, receive and transmit slots. Even four slots every frame can be a power-hungry task. Additionally it may be that a node does not even receive any packet in certain beacon/shared slots but it still is in an active state.

Reduced TSCH Overhead Operation

Embodiments of this disclosure may essentially "skip" the state transition from sleep to active for slots that do not have any allocated functionality for a given device. Additionally, some embodiments may also extend slot skipping to slots that do have various types of functions assigned but not in every frame. In this manner, a device state transition to active state may occur only in the absolutely necessary slots for TSCH protocol operation. For example, say a device received a beacon every four seconds and a TSCH frame is one second. In that case although the device wakes up for every dedicated beacon slot in each frame until the 4$^{th}$ frame, it does not in fact actually use the beacon slot until the 4$^{th}$ beacon slot in the 4$^{th}$ frame. Therefore the beacon slot in the earlier three frames could have been used to perform other functions.

Basic Slot Skipping

Figure 4:
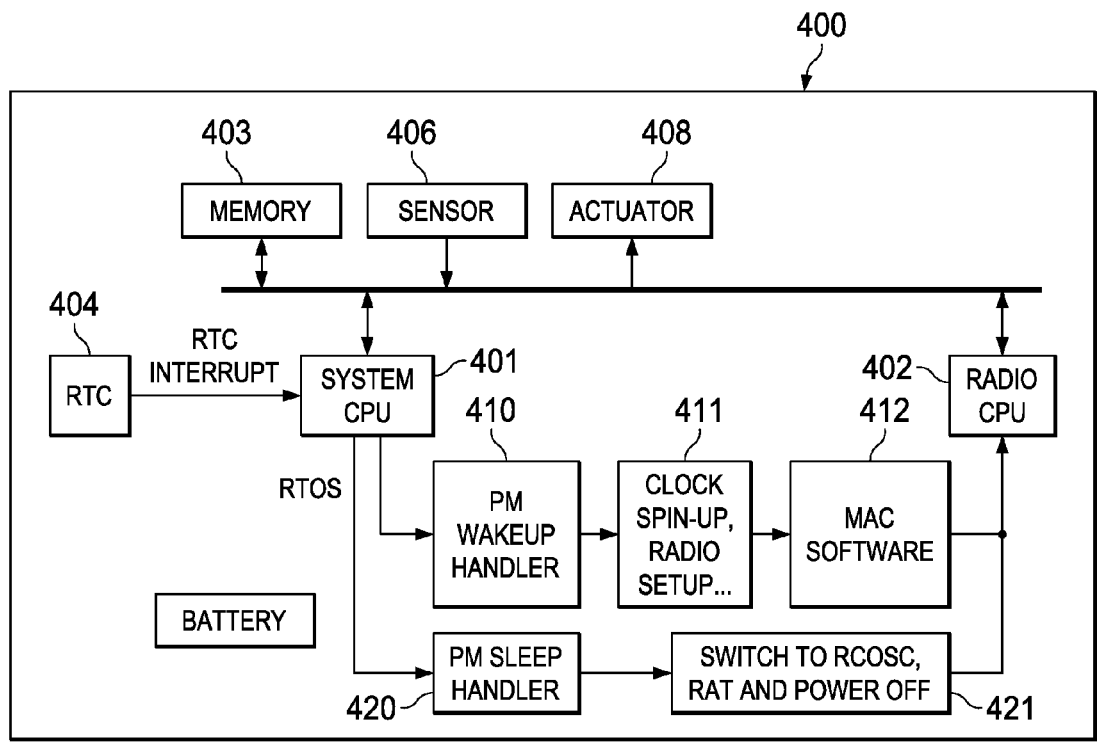
FIG. 4 is a block diagram of an example TSCH device.

FIG. 4 is a block diagram of an example TSCH device 400 that may include a system processor (CPU) 401 that may include memory for holding instructions and data. Nonvolatile memory 403 may store software program instructions that may be executed by CPU 401 and/or CPU 402 to perform some or all of the network functions described herein, for example. A radio CPU 402 may be coupled to the system processor and be configured to transmit and receive data using the wireless TSCH protocol described herein. One or more sensors 406 and/or one or more actuator circuits 408 may be included in device 400 for interacting with the physical world. A real time clock (RTC) 404 may generate periodic interrupts that are provided to processor 401.

The device wakeup may be initiated by an RTC interrupt. A RTC interrupt handler executed in software by processor 401 may then pass control to the power management (PM) wakeup handler 410 which performs the necessary state transition steps 411 such as clock spin, radio setup and so on. From there on, the MAC software 412 typically takes control to issue the necessary "command" to the radio CPU 402. The typical radio command is transmit, receive, or idle. In prior art devices, a RTC compare value was set for wakeup in the next slot after every wakeup. In an embodiment of the present disclosure, a sleep handler function 420 may make a determination for the next slot with an assigned receive/transmit function (this includes beacon and shared) and a corresponding RTC compare value may be set. Each RTC compare value may be easily calculated since the slot duration is known and each device is provided with a schedule of allocated slots for its use. A mode switch function 421 may then be performed to place device 400 in sleep mode during inactive slots.

In this example, functions 410-412 and 420-421 may be performed by software executed on CPU 401.

Figure 5A:
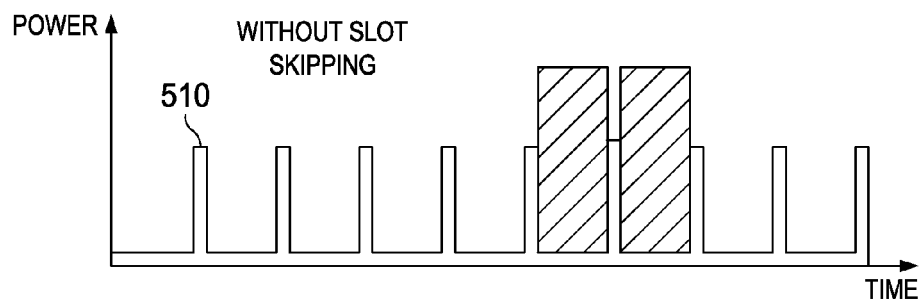
FIGS. 5A-5B are plots of power consumption illustrating slot skipping.
Figure 5B:
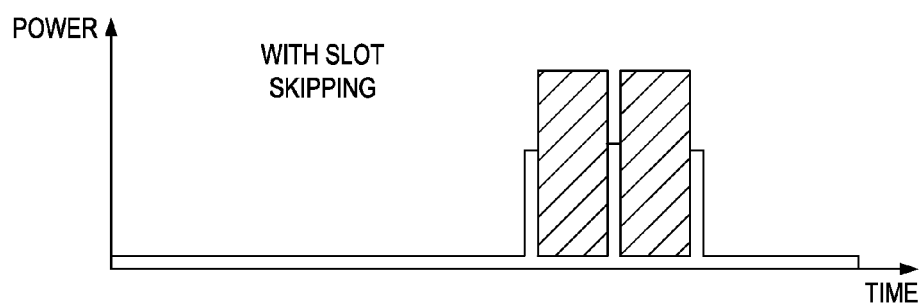

FIG. 5A is a plot of power consumption without slot skipping. Notice the wakeup power used for each wakeup event, as indicated at 510, for example. FIG. 5B is a plot of power consumption with slot skipping in which the unneeded wakeup events are skipped. In this manner, unnecessary power state transition may be reduced if not eliminated using slot skipping. However, the device may still wakeup for beacon, shared, receive, and transmit slots (at least four) for every TSCH frame. A further improvement may be made by extending slot skipping to skip functional slots that are not necessarily used every frame.

Skipping Receive and Transmit Slots

As mentioned previously, only certain receive/transmit slots may actually be used despite being allocated for every frame. This depends on the application requirements of a device. For example, say an application only needs to transmit every minute or wants to transmit only upon an event. For example, let the assigned transmit slot number be four. Then absolute slot numbers for this device's transmit slots are equal to frame count times the frame length plus four. However, only a portion of these slots will actually be used for transmitting. Since the application rate of transmission/reception may be known by a device, it may be factored into calculating the next RTC wakeup for that device. Hence the next RTC wakeup may be set to the minimum of the next beacon/shared slot time or the application RX/TX slot time. Note that the application slot is in terms of absolute slot number as it can span multiple TSCH frames. However, the beacon/shared slot time is for the frame in consideration.

For example, assume a system in which the TSCH slotframe is defined to be sixty-four time slots. Assume, for this example, that the number of slotframes elapsed since the start is ten. Then, if the assigned transmit slot is four, in the eleventh slotframe the absolute slot number will be 10*64+4−1. This is the assigned slot at which the node may transmit.

Thus, when a device knows that it does not need to send or receive for a period of several slotframes, it may simply calculate the slot count for when it will be ready to send or receive or need to do a time beacon check and place a corresponding time delay in the RTC count and go into sleep mode until the RTC again generates a wakeup interrupt after the expiration of the calculated time delay.

Skipping Beacon Slots

FIGS. 6A-6C are plots of power consumption illustrating beacon skipping. Beacon packets are extremely important for the correct operation of TSCH as it is used for maintaining time synchronization of the network. Essentially the beacons are used to correct the synchronization offset caused by clock drift and other uncertainties in the system. Given the clock (crystal) accuracy (typically in terms of ppm), the clock drift may be determined. Hence a beacon may be sent from a root node, such root node 111 or 121 referring again to FIG. 1, to a leaf node in a PAN only in certain frames and not all frames. Therefore, if the leaf and root nodes know a priori the beacon transmission rate, then the unnecessary beacon slots may be skipped.

FIG. 6A illustrates a root node that is skipping beacon slots. In this example, a beacon is transmitted in slot 602 of a second slotframe, but not in slot 601 of a first slot frame nor in slot 603 of a third slotframe. FIG. 6B illustrates a leaf node that does not skip beacon slots. In this example, the leaf node powers up for a beacon check on slots 601-603. The beacon check performed at 611, 613 is not needed and wastes power. FIG. 6C illustrates a leaf node that is skipping beacon slots. In this example, the leaf node need not power up in slots 601, 603 because a beacon is transmitted in slot 602 of a second frame, but not in slot 601 of a first frame nor in slot 603 of a third frame. In this manner, the root node illustrated in FIG. 6A and the leaf node illustrated in FIG. 6C may save power.

Similarly, the root node may transmit a beacon packet in every frame, but the leaf node may simply ignore the unneeded beacons and stay in sleep mode in order to conserve power in the leaf node.

The clock drift depends on environmental conditions such as the temperature of the device as well as other sources of uncertainties such as variable software interrupt latencies. In typical network systems, the period at which beacon packets are sent out should at least be less than that dictated by the clock accuracy. For instance, if a beacon packet is transmitted by the root node every fourth frame to maintain time synch then wakeup for the previous three beacon slots is not necessary. The rate at which the beacons will be sent out may be "piggybacked" in the first beacon in additional information, after which the leaf nodes may wake up only for the beacon slots that will actually have a beacon packet. The "piggybacked" information may be an information element encoded with "beacon periodicity" field consisting of 1 byte, and another byte indicating the slotframe number and frequency at which the beacon is sent.

However, it may be the case that the period at which the beacon is sent out might be too slow or too fast for a leaf node. In that case, the leaf node may piggyback a slowdown factor delta ($\Delta$) in its acknowledgement (ACK) packet, where the ACK packet is sent for a unicast packet received by the node. This mode of operation is compatible when the beacons are sent by the root node or an intermediate node. The beacon adjustment may be done at either node.

FIGS. 7A-7C depict leaf nodes with local time $\Delta$ with respect to the root node. $\Delta$ is the difference between local time instances $t_1$ and $t_2$ shown in FIGS. 7B and 7C. $t_1$ is the time instant the leaf node thinks it should be receiving the beacon. $t_2$ is the actual time instant the leaf node receives the beacon. Depending on if $(t_1-t_2)$ is >0 or <0, the sign and magnitude of $\Delta$ is determined. If $\Delta$ is zero then the nodes are perfectly in time synch with each other. In FIG. 7B, $\Delta$ 702 is zero and the nodes are in time synch. In FIG. 7C, $\Delta$ 704 is non-zero and the nodes are somewhat out of time synch by an amount $t_1-t_2$.

The root/intermediate node may decide to change the beacon rate if the drift factor $|\Delta|$ is above a certain threshold. The threshold may depend on the slot and slotframe size. Note that if the root/intermediate node decides to change the beacon rate, it may first announce a "change beacon frequency" information element in its current beacon. For example, an information packet in the current beacon may contain not only the new frequency rate for the beacon but also the slotframe number after which this beacon frequency will become effective.

A node may detect drift by checking a timestamp of received beacons and calculating a time between beacons as compared to an expected time between beacons. A drift that gets closer to a guard time may indicate or require a beacon rate change. The drift threshold may depend on the drift rate and beacon interval. If the drift rate is such that drift_rate*beacon_interval>guard_time, then a beacon interval change may be requested.

Skipping Shared Slots

Shared slots are essentially contention slots. These are used for devices to join a network as well as by higher level protocols for network route maintenance and so on. If the leaf nodes do not need to engage in network association for new nodes, then they do not need to be turned ON. However, it might still need to be turned ON for higher level protocols such as RPL (routing protocol). In that case, as in the beacon skipping method, a rate for the higher level protocols may be exchanged between the root and leaf nodes. For example, RPL DIO (DODAG (destination oriented directed acyclic graph) Information Object) messages may contain information elements that are similar to the ones that were mentioned for beacon frequency. In this case, this information elements would be added right after the MAC header and may consists of one byte that encodes RPL DIO frequency indication, and another two bytes that indicate the DIO messages frequency. In this manner, only when there are actual packets to be received do the shared slots need to be turned ON.

As described above, Time Slotted Channel Hopping may be used to enhance robustness of low power devices against external interferences. Embodiments of the present disclosure may reduce the power consumption overhead for performing time synchronized channel hopping considerably. It may be especially useful in applications where low-power consumption and robustness is critical for operation.

Figure 8:
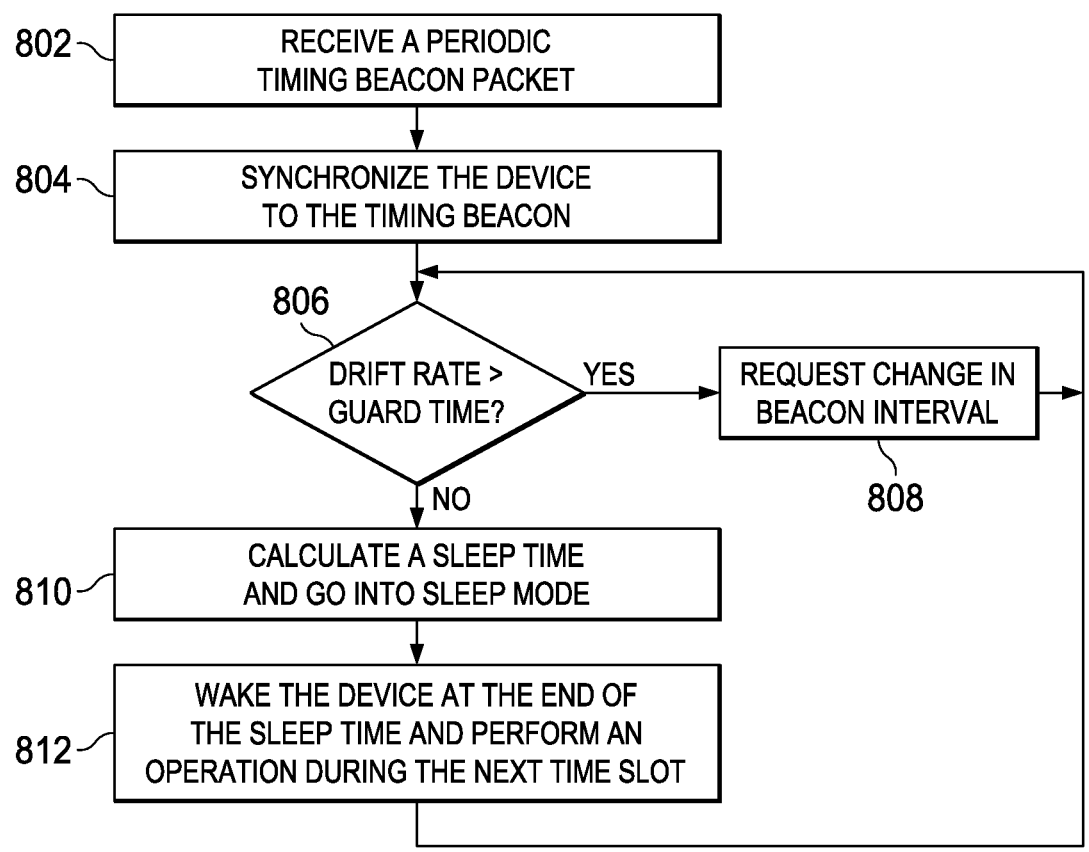
FIG. 8 is a flow diagram illustrating operation of a device in a time slot based communication system.

FIG. 8 is a flow diagram illustrating operation of a device in a time slot based communication system. As described above, the communication system may use an IEEE 802.15.4e time slotted channel hopping protocol that uses sequential frames that each have a plurality of time slots. The number of time slots per frame may be specified by a system administrator or other higher level control function, for example. Typically, each time slot is 10 ms long. Devices in the network may be placed in a low power sleep mode to conserve power during periods of inactivity.

While coupled to the network, the device may receive 802 a timing beacon packet that is broadcast in a time slot of the communication system at a periodic beacon interval rate, as described in more detail above. In some networks, the timing beacon may be broadcast by a network root node during a defined time slot in every frame. In other networks, the timing beacon may be transmitted only once every so many frames, such as N frames, for example. As described above in more detail, the value of N may be determined by a higher level control function and may depend on the size of the frames and the drift rate of various devices in coupled to the network.

The device may then synchronize 804 its time base to the network time base in response to the received timing beacon, as described above in more detail.

In some embodiments, a device may determine 806 that it has a rate of timing drift that exceeds a threshold value. As described above in more detail, if the drift rate is such that drift_rate*beacon_interval>guard_time, then a beacon interval change may be requested 808. The beacon interval change request may be sent by the device to the network root node during a transmit slot allocated to the device, for example.

As described above in more detail, the device may calculate 810 a number of slots until its next allocated slot. Since it does not have any scheduled activity until then, it may transition 810 to the sleep mode in order to reduce power consumption.

As described above in more detail, the sleep time may be determined 810 based on both the beacon time interval and the activity of the device. If it has no scheduled activity, it may remain in sleep mode and skip over allocated receive, transmit and shared slots, for example.

At the expiration of the sleep time, the device may be awakened 812 and restored to an operation mode. As described above, an RTC may be programmed to generate a wakeup interrupt at the end of the sleep time, for example.

In another embodiment, a device may determine 806 that it has a rate of timing drift that exceeds a threshold value. As described above in more detail, if the drift rate is such that drift_rate*beacon_interval>guard_time, then the device may change 808 its sleep time calculation function 810 to skip a fewer number of timing beacons.

System Example

Referring again to FIG. 4, device 400 may be embodied as a CC26xx SimpleLink™ Multistandard Wireless MCU available from Texas Instruments, for example. The CC26xx family of ultralow-power microcontrollers includes multiple devices featuring ultralow power CPU and different peripherals targeted for various applications. For example, the CC2650 contains a 32-bit ARM Cortex-M3 running at 48-MHz as the main processor and a rich peripheral feature set, including a unique ultra-low power sensor controller, ideal for interfacing external sensors and/or collecting analog and digital data autonomously while the rest of the system is in sleep mode. The CC2650 is well suited for applications within a whole range of products including industrial, consumer electronics, and medical. The Bluetooth Low Energy controller and the IEEE 802.15.4 MAC are embedded into ROM and are partly running on a separate ARM Cortex®-M0 processor. This architecture improves overall system performance and power consumption and frees up flash memory for the application. Peripherals may include 12-bit A/D converter, 16-channel comparator with voltage reference generation and hysteresis capabilities, interfaces for, SPI, Microwire and UART protocols, internal DMA, real-time clock, multiple 16/32-bit timers, and more. A detailed description of the CC2650 is provided in publication SWRS158, "CC2650 SimpleLink™ Multistandard Wireless MCU," February 2015, and is incorporated by reference herein.

Each sensor device 400 may be configured to monitor one or more environmental parameters within or around a residence or commercial building, for example. Depending on the capability of the sensor, various types of parameters may be monitored, such as: temperature, pressure in pipes or ducts, flow rate in pipes or ducts, barometric pressure in a room, vibration or other seismic motion, motion within a room or other region, light level, humidity, etc. Each sensor device 400 is equipped with a wireless transmitter that enables it to transmit collected environmental data to a higher level controller in the hierarchy of a network over a wireless link 104, as shown in FIG. 1, for example. Typically, each sensor may also receive commands or instructions over the wireless link from the higher level controller.

Sensor devices 400 may be organized into groups. Grouping may be based on various factors, such as: physical location within a building, type of data being collected by the sensor, etc. Each sensor in a group may wirelessly transmit collected environmental data to a higher level controller assigned to that group, using a wireless signal. For example, the resource system may be the heating, ventilation, and air conditioning (HVAC) system for a residence or commercial building. In response to temperature information gathered by sensors 400, various dampers may be adjusted and cooling or heating operation of the HVAC system may be increased or decreased in order to maintain optimum temperature in each room of the building. In another example, a resource system may be a lighting system for a residence or commercial building. In response to outside light levels, interior light levels, and presence or absence of people in a room as detected by sensor devices 400, lighting to each room may be adjusted.

As described above, Time Slotted Channel Hopping may be used to enhance robustness of low power devices against external interferences. Embodiments of the present disclosure may reduce the power consumption overhead for performing time synchronized channel hopping considerably. It may be especially useful in applications where low-power consumption and robustness is critical for operation.

Other Embodiments

While the invention has been described with reference to illustrative embodiments, this description is not intended to be construed in a limiting sense. Various other embodiments of the invention will be apparent to persons skilled in the art upon reference to this description. For example, while the disclosure was explained in the context of IEEE 802.15.4e, the concepts described herein may be applied to other transmission protocols in order to reduce power consumption.

Embodiments of the device nodes and methods described herein may be provided on any of several types of systems: digital signal processors (DSPs), general purpose programmable processors, application specific circuits, or systems on a chip (SoC) such as combinations of a DSP and a reduced instruction set (RISC) processor together with various specialized sensors and/or actuators. Analog-to-digital converters and digital-to-analog converters may provide coupling to the real world, modulators and demodulators (plus antennas for air interfaces) may provide coupling for waveform reception, for example.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium such as compact disc (CD), a diskette, a tape, a file, memory, or any other computer readable storage device and loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

It is therefore contemplated that the appended claims will cover any such modifications of the embodiments as fall within the true scope and spirit of the invention.

What is claimed is:

1. A method for operating a device in a time slot based communication network, the method comprising:
   receiving a timing beacon packet that is broadcast in a time slot of the communication system at a periodic rate, in which the network uses a time slotted channel hopping protocol of sequential frames each having a plurality of time slots;
   synchronizing the device to the timing beacon;
   calculating a sleep time until an awake mode scheduled by the device;
   placing the device in a sleep mode for the sleep time;
   waking the device at the expiration of the sleep time and operating the device in the awake mode during the next time slot; and
   repeating the steps of calculating a sleep time, going into sleep mode, and waking the device for operation in awake mode after the expiration of each sleep time.

2. The method of claim 1, further including receiving an information packet in which the periodic rate of the beacon time slot is specified, in which the periodic rate spans multiple frames.

3. The method of claim 2, in which the information packet is received during a beacon time slot.

4. A method for operating a device in a time slot based communication network, the method comprising:
   receiving a timing beacon packet that is broadcast in a time slot of the communication system at a periodic rate, in which the network uses a time slotted channel hopping protocol of sequential frames each having a plurality of time slots;
   synchronizing the device to the timing beacon;
   determining that the device has a rate of timing drift that exceeds a threshold value;
   requesting a change in the timing beacon periodic rate to accommodate the rate of timing drift of the device;
   calculating a sleep time until an awake mode scheduled by the device;
   placing the device in a sleep mode for the sleep time;
   waking the device at the expiration of the sleep time and operating the device in the awake mode during the next time slot; and
   repeating the steps of calculating a sleep time, going into sleep mode, and waking the device for operation in awake mode after the expiration of each sleep time.

5. The method of claim 1, in which calculating sleep time results in skipping one or more available timing beacons and sequential frames.

6. A method for operating a device in a time slot based communication network, the method comprising:
   receiving a timing beacon packet that is broadcast in a time slot of the communication system at a periodic rate, in which the network uses a time slotted channel hopping protocol of sequential frames each having a plurality of time slots;
   determining that the device has a rate of timing drift that exceeds a threshold value;
   synchronizing the device to the timing beacon;
   changing the calculation of sleep time to reduce the length of the sleep time in order to skip a fewer number of available timing beacons;
   calculating a sleep time until an awake mode scheduled by the device;
   placing the device in a sleep mode for the sleep time;
   waking the device at the expiration of the sleep time and operating the device in the awake mode during the next time slot; and
   repeating the steps of calculating a sleep time, going into sleep mode, and waking the device for operation in awake mode after the expiration of each sleep time.

7. The method of claim 1, further including determining a next needed time when the device will need to transmit or receive data and setting the sleep time to correspond the next needed time.

8. The method of claim 1, in which the sleep time spans more than one of the sequential frames.

9. A device comprising:
   a radio circuit operable to receive a timing beacon that is broadcast in a time slot of a communication system in a network using a time slotted channel hopping protocol of sequential frames, each frame having a plurality of time slots;
   time base circuitry with a real time clock (RTC) operable to synchronize with the timing beacon;
   control logic coupled to the radio circuit, in which the device is configured by the control logic to calculate a sleep time for a number of time slots until the device schedules an awake mode, set the RTC with the sleep time, place the device in a sleep mode, wake the device at the expiration of the sleep time in response to an interrupt from the RTC, and operate the device in the awake mode at the expiration of the sleep time; and
   power management logic operable to cause the device to operate in the sleep mode for the sleep time and in the awake mode.

10. The device of claim 9, further including at least one sensor coupled to the control logic that is operable to generate data for transmission by the radio circuit.

11. A device comprising:
a radio circuit operable to receive a timing beacon that is broadcast in a time slot of a communication system in a network using a time slotted channel hopping protocol of sequential frames, each frame having a plurality of time slots;
time base circuitry with a real time clock (RTC) operable to synchronize with the timing beacon;
control logic coupled to the radio circuit, in which the device is configured by the control logic to calculate a sleep time for a number of time slots until the device schedules an awake mode, set the RTC with the sleep time, place the device in a sleep mode, wake the device at the expiration of the sleep time in response to an interrupt from the RTC, operate the device in the awake mode at the expiration of the sleep time, determine that the device has a rate of timing drift that exceeds a threshold value and request a change in the timing beacon periodic rate to accommodate the rate of timing drift of the device; and
power management logic operable to cause the device to operate in the sleep mode for the sleep time and in the awake mode.

12. The device of claim 9, in which calculating sleep time results in skipping one or more available timing beacons and sequential frames.

13. A device comprising:
a radio circuit operable to receive a timing beacon that is broadcast in a time slot of a communication system in a network using a time slotted channel hopping protocol of sequential frames, each frame having a plurality of time slots;
time base circuitry with a real time clock (RTC) operable to synchronize with the timing beacon;
control logic coupled to the radio circuit in which the device is configured by the control logic to calculate a sleep time for a number of time slots until the device schedules an awake mode, set the RTC with the sleep time, place the device in a sleep mode, wake the device at the expiration of the sleep time in response to an interrupt from the RTC, operate the device in the awake mode at the expiration of the sleep time, determine that the device has a rate of timing drift that exceeds a threshold value, and change the calculation of sleep time to reduce the length of the sleep time in order to skip a fewer number of available timing beacons; and
power management logic operable to cause the device to operate in the sleep mode for the sleep time and in the awake mode.

14. The device of claim 9 in which the control logic is further operable to determine a next needed time when the device will need to transmit or receive data and setting the sleep time to correspond the next needed time.

15. The device of claim 9, in which the sleep time spans more than one of the sequential frames.

16. A non-transitory computer readable medium storing software instructions that, when executed by a processor of a device, cause a method for operating the device in a time slot based communication system to be performed, the method comprising:
receiving a timing beacon packet that is broadcast in a time slot of the communication system at a periodic rate, in which the network uses a time slotted channel hopping protocol of sequential frames each having a plurality of time slots;
synchronizing the device to the timing beacon;
calculating a sleep time until an awake mode scheduled by the device;
placing the device in a sleep mode for the sleep time;
waking the device at the expiration of the sleep time and operating the device in the awake mode during the next time slot; and
repeating the steps of calculating a sleep time, going into sleep mode, and waking the device for operation in awake mode after the expiration of each sleep time.

17. A non-transitory computer readable medium storing software instructions that, when executed by a processor of a device, cause a method for operating the device in a time slot based communication system to be performed, the method comprising:
receiving a timing beacon packet that is broadcast in a time slot of the communication system at a periodic rate, in which the network uses a time slotted channel hopping protocol of sequential frames each having a plurality of time slots;
determining that the device has a rate of timing drift that exceeds a threshold value;
requesting a change in the timing beacon periodic rate to accommodate the rate of timing drift of the device;
synchronizing the device to the timing beacon;
calculating a sleep time until an awake mode scheduled by the device;
placing the device in a sleep mode for the sleep time;
waking the device at the expiration of the sleep time and operating the device in the awake mode during the next time slot; and
repeating the steps of calculating a sleep time, going into sleep mode, and waking the device for operation in awake mode after the expiration of each sleep time.

18. The method of claim 16 in which calculating sleep time results in skipping more than one of the sequential frames.

19. A non-transitory computer readable medium storing software instructions that, when executed by a processor of a device, cause a method for operating the device in a time slot based communication system to be performed, the method comprising:
receiving a timing beacon packet that is broadcast in a time slot of the communication system at a periodic rate, in which the network uses a time slotted channel hopping protocol of sequential frames each having a plurality of time slots;
determining that the device has a rate of timing drift that exceeds a threshold value;
synchronizing the device to the timing beacon;
calculating a sleep time until an awake mode scheduled by the device;
changing the calculation of sleep time to reduce the length of the sleep time in order to skip a fewer number of available timing beacons;
placing the device in a sleep mode for the sleep time;
waking the device at the expiration of the sleep time and operating the device in the awake mode during the next time slot; and
repeating the steps of calculating a sleep time, going into sleep mode, and waking the device for operation in awake mode after the expiration of each sleep time.

20. The method of claim 16, further including determining a next needed time when the device will need to transmit or receive data and setting the sleep time to correspond the next needed time.

* * * * *